United States Patent
Bach

(10) Patent No.: US 8,099,330 B1
(45) Date of Patent: Jan. 17, 2012

(54) SYSTEM AND METHOD FOR SOLICITING AND RECEIVING MERCHANDISE ORDERS

(76) Inventor: Joseph Bach, Morgan Hill, CA (US)

(*) Notice: Subject to any disclaimer, the term of this patent is extended or adjusted under 35 U.S.C. 154(b) by 1826 days.

(21) Appl. No.: 09/327,085

(22) Filed: Jun. 4, 1999

(51) Int. Cl.
*G06Q 30/00* (2006.01)

(52) U.S. Cl. .................................................... 705/26.1

(58) Field of Classification Search .............. 705/26, 705/26.1
See application file for complete search history.

(56) References Cited

U.S. PATENT DOCUMENTS

| | | | |
|---|---|---|---|
| 5,303,393 A * | 4/1994 | Noreen et al. ............... | 455/12.1 |
| 6,389,055 B1 * | 5/2002 | August et al. ............... | 375/130 |

OTHER PUBLICATIONS

Thomas More, "Go Wireless", 1998, More Online.*
Definition of "buffer" from A—> Z Dictionary.*
Definition of "memory" for A—> Dictionary.*
Information on How Modems Work Printed from "www.howstuffworks.com".*

* cited by examiner

*Primary Examiner* — Naresh Vig
(74) *Attorney, Agent, or Firm* — Joseph Bach

(57) ABSTRACT

A rider signal is transmitted over programming signal. The rider signal is stored in a rider buffer and includes merchandise ordering data. When a user wishes to order the merchandise, the system establish a channel of communication with an ordering center and places an order according to the data in the rider buffer. The system is particularly useful for implementation in car audio systems and personal computers.

4 Claims, 2 Drawing Sheets

000# SYSTEM AND METHOD FOR SOLICITING AND RECEIVING MERCHANDISE ORDERS

BACKGROUND OF THE INVENTION

1. Field of the Invention

The invention relates to a system and a method for soliciting and receiving orders for merchandise. The system and method are particularly useful for solicitation over radio and/or interne transmission.

2. Description of the Related Art

The present invention bridges three different fields of prior art, which will be noted below. First, the invention is applicable to conventional programming radio transmission, such as AM and FM transmission. Radio transmission is well known and there's no need to elaborate on it, except to note that it is well known to transmit a "rider" in addition to the actual program transmission. For example, it is known to transmit a station's call letters or music format, so that it can be displayed in radio system equipped with decoder to decode such rider transmission. This system is generally referred to as Radio Data System (RDS) and is available on many advanced car audio systems (see, e.g., Blaupunkt™ Florida DigiCeiver). Second, mobile telephony, such as cellular and PCS, is also a well known technology and need no further explanation. Finally, the interne is a well known technology and needs no further explanation.

Solicitation over radio transmission is currently done only by commercials which are timed between regular programming periods. Generally there would be a programming period, for example playing of three songs, and then a commercial period. Currently, the most direct solicitation in such commercials is to provide the listener with a phone number to call and inquire or place an order for the advertised product. Solicitation over the internet is done generally using web pages, where the potential customer may use a search engine to look for a particular product, or brows over the offering of the particular web page. One specific example is the selling of music over the internet. For example, one may enter general web pages such as cdnow.com or member only pages such as BMG or Columbia. There, the user may either use a search engine to search for a particular CD by entering the title, artist, band etc. Alternatively, the user may brows the offering, for example, alphabetically. Notably, in addition to having a picture of the CD cover, the user may also listen to clips from the albums over the internet. Moreover, new technologies allow the user to download entire pieces digitally and store them in a memory, rather than purchasing the album. Such downloads are generally available for a fee.

The above noted technologies and services are very useful and support commerce. However, there is a need for capitalizing on the synergy available when combining two or more of these technologies and services.

SUMMARY OF THE INVENTION

The present invention takes advantage of generally existing technologies and combines them to capitalize of resulting synergy. The various embodiments for the system and method describe herein would enhance the use of the available technologies and services and further support commerce.

Under a first implementation, a rider corresponding to the broadcast program is provided on the radio transmission. For example, when the program is playing a particular piece of music, the rider may include a specific identification of that music, such as, for example, a code, an ordering telephone number, the title and artist, the album's name, etc. The radio receiver is equipped with a rider buffer, an "order" button, and is coupled to a telephony system. Further, the radio is equipped with an "ordering information" memory in which the user stores various ordering information such as, for example, first and last name, shipment address, billing information, etc. When the rider is received, it is stored in the rider buffer. Each new rider replaces the old stored rider in the buffer.

When a listener hears a song or a commercial for a product the listener wishes to purchase, the listener presses the "order" button. This causes the radio to recall the telephone number stored in the rider buffer and utilize the telephony system to place an order call. When the line is answered and a handshake is completed, the radio fetches the product information from the rider buffer and the ordering information from the ordering information memory and sends the information over the telephony system. Once the order is received, a confirmation is sent back to the radio and displayed for the user.

It should be readily apparent that the above described system can be implemented in a home radio connected to either a regular or a mobile telephone, or in a car radio coupled to a cellular telephone. Of course, the telephone may be an integral part of the radio. Additionally, radio stations now also transmit over the internet. That is, it is very common for a radio station to have a web page, in which a user may click on an icon, such as "Media Player™" or "Real Player™" and receive the audio signal of the radio station over the internet to one's computer. Of course, the inventive system is readily adaptable to the internet. That is, when the reader enter the radio station's web page and receives the audio signal, a rider is also sent over the internet. The rider is stored in the computer, along with ordering information. When the user clicks on an ordering icon, the order is simply placed over the internet, and the need for a telephony system is obviated.

Moreover, the system is adaptable as a third alternative to the search and browse offering of web sites on the internet. For example, music web sites may have an icon for obtaining audio transmission. This may be either of an associated radio station, or a programming provided by the web-site owner. The user may have the option to select from various programming formats (e.g., classical, jazz, rock etc.). As in the above embodiments, once the user hears a song the user wishes to purchase, the user may click on an ordering icon and the computer would automatically place an order over the internet. Of course, the user may specify the format (e.g., cassette, CD, download, etc.) in the ordering information or at the time of ordering.

Notably, the rider may include a rider ID. The rider ID may relate to information such as the source (e.g., radio station call letters), the transmission time and date, etc. This information may be included in the order placed and can be used to track effectiveness of a program and/or provide royalty payment to the transmission source. Thus, for example, advertising over the radio may be transformed from an "air time purchase" to free air time, but royalty payments would be due upon placement of an order. This of course, cause the radio stations to be as selective about advertisers, as advertisers are today selective of radio stations.

DETAILED DESCRIPTION

Figure 1:
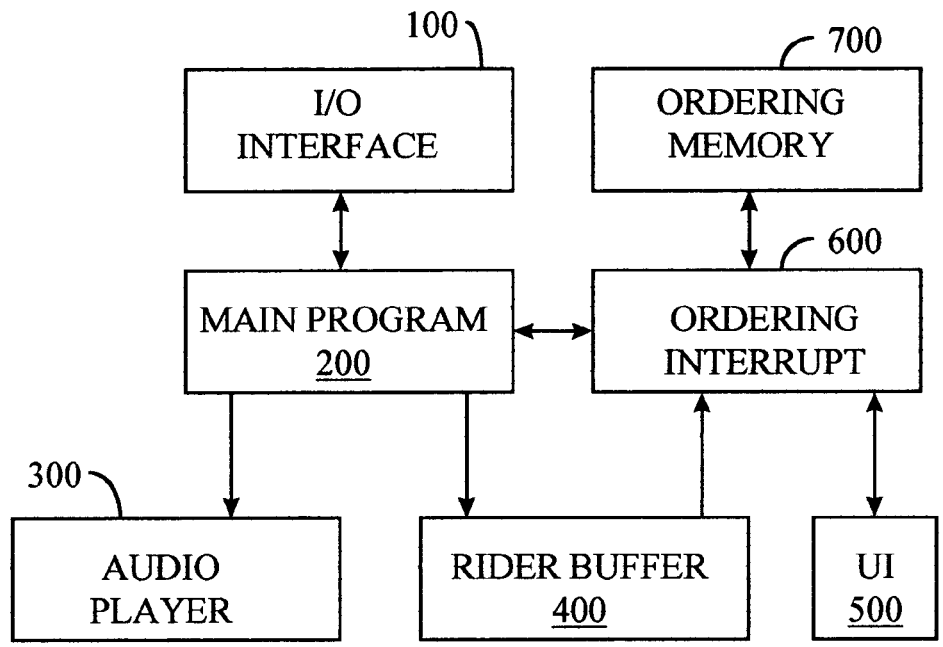
FIG. 1 is a top level block diagram of a system according to the preferred embodiment of the present invention.
Figure 2:
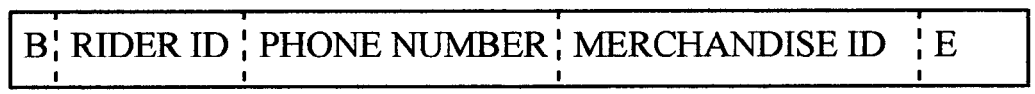
FIG. 2 is a block diagram depicting the various cells of the rider according to a preferred embodiment of the present invention.

FIG. 1 depicts a generic apparatus according to a preferred embodiment of the present invention. Programming signal is received via I/O interface 100, together with the rider. The main program 200 sends the programming signal to the audio player 300 and the rider to the rider buffer 400. An exemplary rider is shown in FIG. 2. Specifically, the rider according to the preferred embodiment includes a header, B, signifying the start of the rider. Then follows an ID of the rider which may include, for example, the source ID and transmission date and time. This is followed by a contacting information, such as an automated phone number. Then, a merchandise ID is provided (e.g., bar code number, description, price, etc.). Finally, a trailer, E, is provided signifying the end of the rider. Some or all of the information stored in the rider buffer may be displayed on the user interface 500.

At any time, a user can enter ordering information using the user interface 500. In the case of a computer, this can be done using a graphic user interface (GUI), while in the case of a radio this can be done by keying information or downloading information from a computer, a hand-held device, or a custom device specific for that purpose. The ordering information may include, for example, the user's first and last name, preferred shipment address, billing information (e.g., credit card information), shipment preferences (e.g., ship air, FedEx, etc.), and other preferences (e.g., CD for music, clothing sizes, etc.).

At any time the user may also use the user interface to place an order. When that happens, the ordering interrupt fetches the ordering information from the rider buffer, and uses the I/O interface to connect to the ordering center indicated in the ordering information. Once a communication channel is established, the ordering interrupt fetches the merchandise and optionally the rider ID and sends it to the ordering center, together with the ordering information from the memory 700. Once the ordering is completed, preferably a confirmation is sent from the ordering center and is displayed on the user interface 500. Of course, throughout the entire ordering process, the main program can continue to receive programming signal and the rider. However, if the ordering interrupt has been activated, it is preferred that the main program would not send the rider to the rider buffer, but rather place it in an internal buffer until the ordering process is completed. Alternatively, when the ordering interrupt is activated, it copies the entire rider from the rider buffer and stores it in an internal buffer. Then, the main program can store riders in the rider buffer at will.

A specific embodiment of the inventive system in a car audio system will now be described in more details, with reference to FIG. 3. Specifically, car audio systems are becoming increasingly sophisticated and capable of performing many functions. For example, as noted above, RDS decoders are available on many advanced in-dash audio systems and, in fact, are standard in many European cars since RDS is widely used in Europe. Other, more advanced systems such as the Clarion® AutoPC® for example, are capable of interpreting voice command of the user, receiving and decoding GPS signals, and automatically operating and interfacing to a cellular phone. The AutoPC® also includes IR and USB interfaces for exchanging data with a PC or hand-held Windows-CE compatible organizer. Systems such as the AutoPC® are prime candidates for the implementation of the inventive system. Specifically, the ordering data can be input using the voice, IR or USB interface, and stored in the system, or on the available 16 MB memory card.

Radio programming is received by the RF receiver 310 via the FM antenna and is played in the conventional manner through the audio amplifier 320. The rider on the RDS is also received by the RF receiver 310 and also stored either in the internal memory 340 or in the memory card (not shown). Certain information from the RDS may be displayed on the GUI (UI 360), such as the station call letters, the title of the song currently being played, and the price of the album. An ordering command may be input either vocally, via the GUI or push buttons, or via the IR or USB interfaces, all identified in FIG. 3 as user interface UI 360. Then, the main processor 300 of the AutoPC® activates the interrupt module 305 to accesses the memory 340 to fetch the calling number form the rider and place a call using the mobile phone 350. When a communication channel is established, the main processor 300 transmits the item and ordering information. When a confirmation is received, it is displayed on the UI 360 or played audibly via audio amp 320, or both. Thus, when a user hears a particular piece of music the user would like to purchase, the user need not know the album or song title, the performer, or anything else. The user merely needs to input a purchase command and the purchase order will be placed automatically.

Moreover, when an advertisement is being broadcast, the rider may include data to be displayed on the GUI, such as features, price, delivery time etc. As noted previously, the rider may include a source ID, such as the radio station's call letters and the transmission date and time. This information can be included in the order, so that proper credit may be given to the station.

Figure 3:
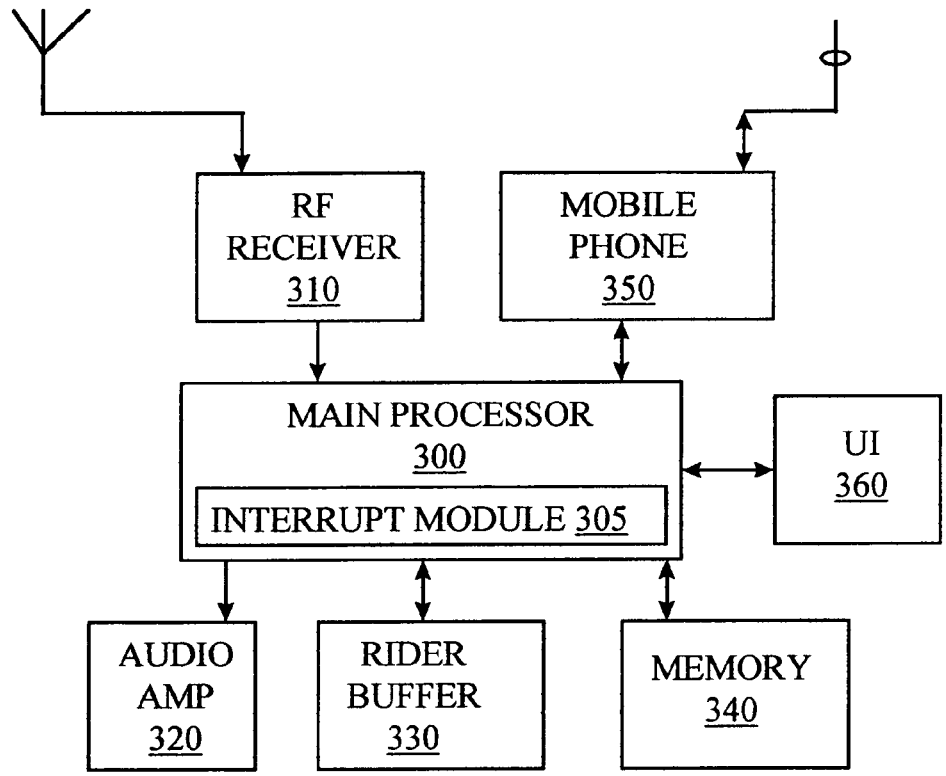
FIG. 3 is block diagram of an embodiment of the present invention implemented in a radio system.

Also, it should be appreciated that the embodiment of FIG. 3 can be easily implemented in a home audio system. The main elements of FIG. 3 would be substantially the same, however, the mobile phone 350 should be preferably switched to a land-based conventional phone.

In any of the embodiments described herein, the communication for placing the order can be done using any conventional data transmission and communication method. For example, one simplified method that can be easily implemented in the embodiment of FIG. 3 is a facsimile transmission. That is, the rider and personal ordering information can be stored in fields. Then, a rather simple program (e.g., Microsoft® Fax; Visioneer™ PaperPort™ and 3D FaxSpeed™) can be used to construct a facsimile page, negotiated for the communication channel, and transmit the fax over the communication channel. At the ordering center a central computer can be used to receive all the incoming faxes and store them in an ordering memory to be accessed by the fulfillment staff. Such an arrangement in preferable over an array of fax machines.

It should be appreciated that while the above facsimile based system is rather simple to implement, a data-based system would be preferable from logistical stand point. That is, a system which uses data transmission to send the data field would enable the ordering center to manipulate and edit the data when it is received. For example, it would be rather easy and simple to produce reports of the incoming, pending and fulfilled orders. Additionally, if the order is received in data fields format, it would be easier to implement automation at the fulfillment stage. For example, shipment labels can be printed automatically using the ordering information; merchandise in the warehouse can also be retrieved automatically using the information from the rider's data fields.

Figure 4:
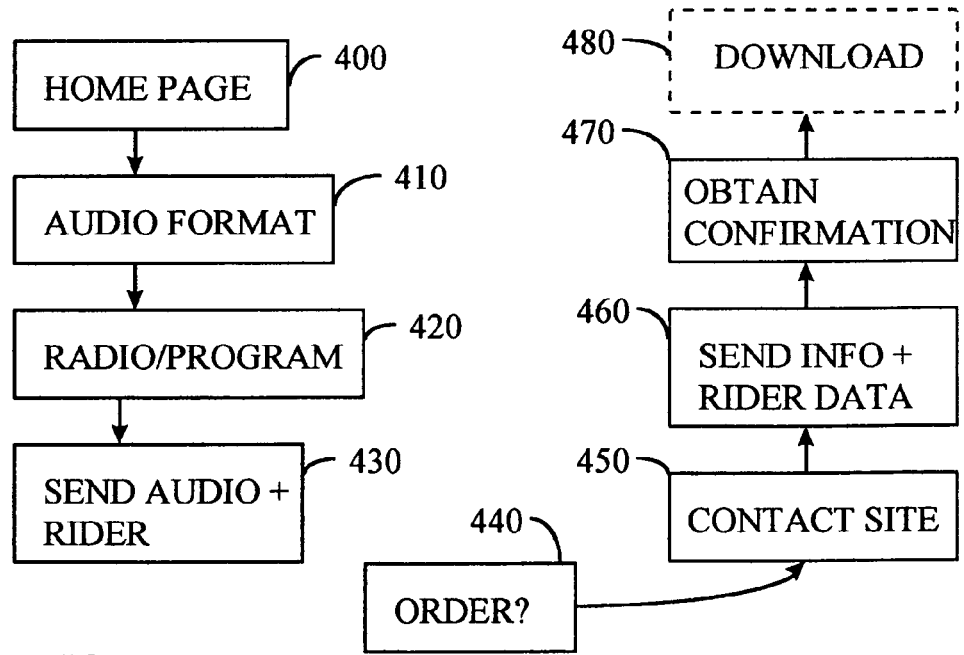
FIG. 4 is a flow chart depicting a process flow of the system of the invention as implemented over the interne.

Another embodiment would be described with respect to music web sites, making reference to FIG. 4. Specifically, currently music web sites include a search engine and a browser. They also have the option of listening to the music before purchase. Purchasing can be done either by ordering a hard copy, such as a cassette or CD, or by downloading an electronic copy of a chosen format. For example, music can be searched by Genre, Album, Song, Artist, or Label and then ordered for download on site to www.liquidmusicnetwork.com and www.a2bmusic.com (both offer free download of a player.

According to one embodiment of the inventive system, these web marketing tools are enhanced as follows. At the home page 400, icons are provided for the user to select a particular programming format 410, e.g., classical, jazz, rock etc. Once the format 410 is chosen, the user is further provided icons of radio stations having such programming format, or selecting the web site's own programming 420. Once selected, the radio or web own programming is transmitted over the web for listening over the computer 430. As in the above embodiments, a rider is also transmitted and stored in a rider buffer.

The user may then go to other programs on the computer while keeping the music on. However, an ordering icon 440 is programmed to "stay on top" so that it is always visible over any program, similar to the manner the Microsoft® clock can be kept always on top. When the user hears a song the user would like to order, the user merely needs to click the icon 440 and the order is placed online directly to the website. That is, an access to the ordering page on the site is negotiated by the computer 450. When it is achieved, the rider and personal ordering information is transmitted to the site 460, preferably in a data field format. When a confirmation is obtained, 470, it is displayed or played audibly by the computer. If the personal ordering information specifies the order as a download, the download 480 is initiated either immediately, or at a later time—depending on the preference specified by the user.

While the invention has been described with reference to particular embodiments thereof, various embodiments and modification can be implemented by those skilled in the art without departing from the invention's scope and spirit, as defined in the appended claims.

What is claimed is:

1. An interactive audio system, comprising:
    a home audio system having a user interface;
    a communication device connecting said home audio system to a telephone;
    an audio player receiving music signal and audibly playing music pieces from said music signal;
    a rider buffer storing data corresponding to said music pieces;
    a main processor receiving a programming signal and a rider signal from a program transmission channel and directing said programming signal to the audio player and storing the rider signal in the rider buffer;
    an ordering interrupter;
    wherein upon receiving a command from the user interface, said ordering interrupter instructs the communication device to establish communication with an ordering center via said telephone, and places an order for a hard copy of the music piece corresponding to the data stored in said rider buffer.

2. The system of claim 1, further comprising an ordering memory having ordering data stored therein.

3. The system of claim 1, wherein said communication device comprises a cellular phone.

4. The system of claim 1, wherein said communication device comprises a modem.

* * * * *